March 27, 1962 J. F. SHANNON ETAL 3,026,745
EPICYCLIC GEARING

Filed June 29, 1960 2 Sheets-Sheet 1

INVENTORS
JAMES FORREST SHANNON
CHARLES TATE
JAMES FULTON

ATTORNEY

March 27, 1962  J. F. SHANNON ETAL  3,026,745
EPICYCLIC GEARING
Filed June 29, 1960  2 Sheets-Sheet 2
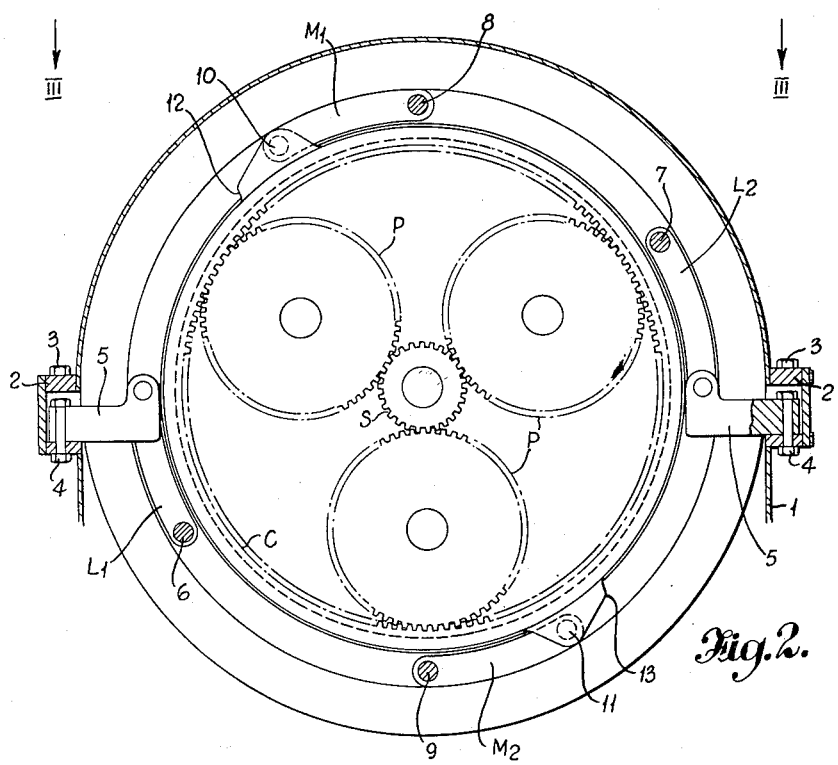
Fig. 2.
Fig. 3.
INVENTORS
JAMES FORREST SHANNON
CHARLES TATE
JAMES FULTON
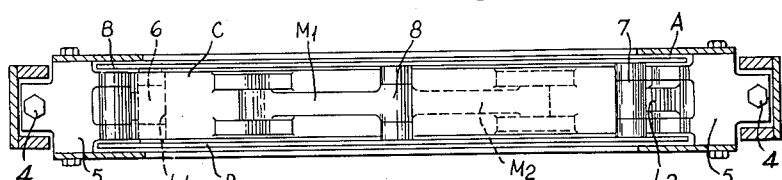
ATTORNEY 3,026,745
EPICYCLIC GEARING
James Forrest Shannon, Bowden, and Charles Tate and James Fulton, Sale, England, assignors to Associated Electrical Industries Limited, London, England, a British company
Filed June 29, 1960, Ser. No. 39,473
Claims priority, application Great Britain July 1, 1959
3 Claims. (Cl. 74—801)

The invention relates to epicyclic gearing systems.

In such gearing systems any radial displacement of the planet gears with respect to the surrounding gear annulus will destroy the load balancing on the planet gear wheels, and it is an object of the invention to support the epicyclic gearing system in such a way as to avoid this.

It has already been proposed to suspend an epicyclic gear annulus from an outer casing by means of links having resilient material interposed at the connection joints.

According to the present invention an epicyclic gearing system is supported within an external casing in such a manner as to maintain substantial equality of loading on the planet gear wheels by means of an intermediate ring and by pairs of pivoted links connecting the intermediate ring to the external casing and to the gear annulus.

The pivot axes of the pair of links connecting the intermediate ring to the external casing lie on radii which are angularly displaced from radii on which lie the pivot axes of another pair of links connecting the intermediate ring to the gear annulus so that the gear annulus, and with it the planet gears, can float in the plane of the epicyclic gearing system within the limits imposed by the dimensions of the links and the spacing of the gear annulus, the ring and the casing, and these dimensions can be such as to compensate the normally expected displacement of the planet gears with respect to the gear annulus which might otherwise take place.

An example of an epicyclic gearing system according to the invention will now be described in more detail with reference to the accompanying drawings, in which:

FIG. 2 shows the mechanical arrangement of an epicyclic gearing system embodying the invention;

FIG. 3 is a view of the gear in FIG. 2, partly in section taken from the direction III—III with the external casing removed to show the linkage.

Figure 1:
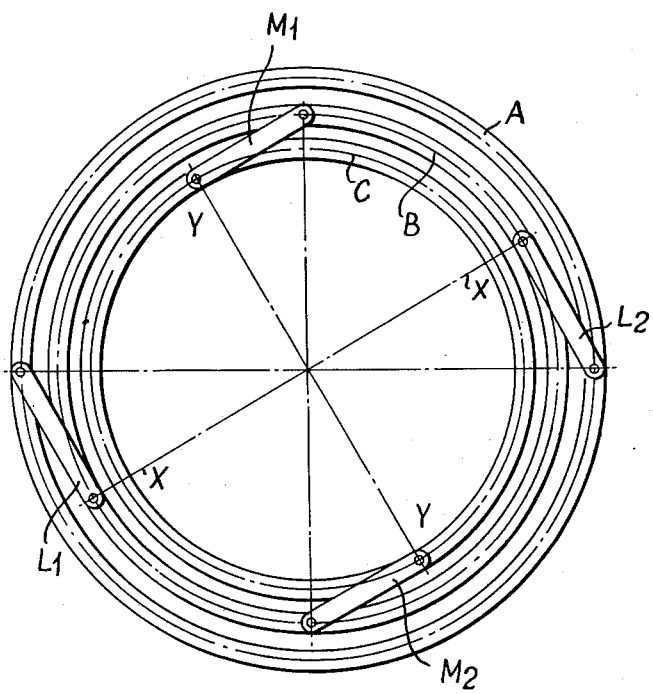
FIG. 1 is a sketch illustrating the principle involved.

Referring to FIG. 1 an outer ring A is rigidly fixed to the gear case. An inner ring B is attached to the outer ring A by links L1 and L2 which are parallel to one another and whose respective pivot axes are diametrically opposite one another. The intermediate ring B is attached to the gear annulus C by links M1 and M2 which are also diametrically opposite to each other, parallel to each other, and at right angles to the links L.

It will be seen that if the gear annulus C requires movement along X—X, links M1 and M2 will remain stationary but links L1 and L2 will swing and rings B and C will move in the required direction.

If movement of the annulus is required along Y—Y, links L1 and L2 will remain stationary but links M1 and M2 will swing and allow movement.

Thus, any floating movement of the annulus in its own plane resolves into components along X—X and Y—Y, and any arbitrary position of the annulus may be obtained, the annulus remaining rotationally fixed at all times.

Referring now to FIGS. 2 and 3, the epicyclic gearing system consists of a sun pinion S around which, and meshing with it is a plurality of planet gear wheels P. These planet gear wheels mesh with the gear annulus C which provides a reaction member to the planets P. The planets P will then revolve round the sun pinion S. In order to cater for any displacement of the planet system and to enable the load to be shared equally between the planet wheels, according to the invention, the gear annulus C is supported to allow free movement in any direction in the manner already described, the linkages being similarly referenced.

The external ring casing is carried on a fixed gear case 1 by means of welded lugs 2 and bolts 3. To the lugs 2 there are secured by bolts 4 the cantilever forks 5 forming the fixed bearings for the pivoted links L1 and L2, whose free ends are pivoted at 6 and 7 to the intermediate ring B. The swinging links M1 and M2 are pivoted at 8 and 9 to the intermediate ring B and at 10 and 11 to lugs 12 and 13 fixed to the gear annulus C.

FIG. 3 shows more clearly how the intermediate ring B consists of a pair of similar component rings secured in parallel relationship within the external ring A. FIG. 3 also shows the bearing bushes between the parallel rings whereby the pivoted links L1, L2 and M1, M2 are secured to the intermediate ring at the pivot points such as 7 and 8.

What we claim is:

1. An epicyclic gearing system supported within a fixed external casing and comprising a sun gear wheel connected to a shaft, planet gear wheels, a gear annulus surrounding the planet gear wheels, the said planet wheels meshing with the sun wheel and the gear annulus, said gear annulus being suspended from the external casing for floating movement in the plane of the planet wheels by means of an intermediate ring and a first set of pivoted linkages connecting the intermediate ring to the external casing and a second set of pivoted linkages connecting the gear annulus to the intermediate ring, both of the sets of pivoted linkages having their pivoting axes extending parallel to the axis of the epicyclic gear, the said first set of pivoted linkages comprising a first pair of links having pivot points diametrically opposite to each other and the second set comprising a second similar pair of links also having their respective pivot points diametrically opposite to each other and upon a diameter at right angles to the diameter containing the pivoting axes of the first pair of links so that the first pair of links allow motion relative to the external casing of both the intermediate ring and the gear annulus suspended therein in the common plane containing the planet wheels in a direction at right angles to the direction of relative motion allowed by the second pair of links to the gear annulus with respect to the intermediate ring.

2. An epicyclic gearing system supported within a fixed external casing and comprising a sun gear wheel connected to a shaft, planet gear wheels, a gear annulus surrounding the planet gear wheels, the said planet wheels meshing with the sun wheel and the gear annulus, said gear annulus being suspended from the external casing for floating movement in the plane of the planet wheels by means of an intermediate ring and a first set of pivoted linkages connecting the intermediate ring to the external casing and a second set of pivoted linkages connecting the gear annulus to the intermediate ring, both of the sets of pivoted linkages having their pivoting axes extending parallel to the axis of the epicyclic gear, the said first set of pivoted linkages comprising a first pair of links having pivot points diametrically opposite to each other and the second set comprising a second similar pair of links also having their respective pivot points diametrically opposite to each other and upon a diameter at right angles to the diameter containing the pivoting axes of the first pair of links so that the first pair of links allow motion relative to the external casing of both the intermediate ring and the gear annulus suspended therein in the common plane containing the planet wheels in a direction at right angles to the direction of relative motion allowed by the second pair of links to the gear annulus with respect to the intermediate ring, the said intermediate ring being supported from the fixed external casing by a pair of cantilever members whose outer ends are each secured at diametrically opposite points of the external casing and whose inner ends provide the fixed pivot bearings for the ends of the said first pair of pivoted links, the other ends of which links are pivoted to the intermediate ring.

3. An epicyclic gearing system supported within a fixed external casing and comprising a sun gear wheel connected to a shaft, planet gear wheels, a gear annulus surrounding the planet gear wheels, the said planet wheels meshing with the sun wheel and the gear annulus, said gear annulus being suspended from the external casing for floating movement in the plane of the planet wheels by means of an intermediate ring and a first set of pivoted linkages connecting the intermediate ring to the external casing and a second set of pivoted linkages connecting the gear annulus to the intermediate ring, both of the sets of pivoted linkages having their pivoting axes extending parallel to the axis of the epicyclic gear, the said first set of pivoted linkages comprising a first pair of links having pivot points diametrically opposite to each other and the second set comprising a second similar pair of links also having their respective pivot points diametrically opposite to each other and upon a diameter at right angles to the diameter containing the pivoting axes of the first pair of links so that the first pair of links allow motion relative to the external casing of both the intermediate ring and the gear annulus suspended therein in the common plane containing the planet wheels in a direction at right angles to the direction of relative motion allowed by the second pair of links to the gear annulus with respect to the intermediate ring, the said intermediate ring comprising a pair of component rings secured together in parallel planes normal to the axis of the gear, bearings for the said pivoted links mounted to the said respective component rings between the latter, such bearings each comprising a pair of bearing bushes having a common axis parallel to the axis of the epicyclic gear, and one end of a respective pivoted link being pivotally mounted in the said bearing bushes.

References Cited in the file of this patent

UNITED STATES PATENTS

| | | |
|---|---|---|
| 1,880,982 | Rawlings | Oct. 4, 1932 |
| 2,027,655 | Stoeckicht | Jan. 14, 1936 |
| 2,801,552 | Stubbings et al. | Aug. 6, 1957 |